United States Patent [19]
Veronesi et al.

[11] Patent Number: 5,205,653
[45] Date of Patent: Apr. 27, 1993

[54] BEARING ASSEMBLY AND SUBMERSIBLE PROPULSOR UNIT INCORPORATING THE SAME

[75] Inventors: Luciano Veronesi; James A. Drake, both of O'Hara Township, Allegheny County, Pa.

[73] Assignee: Westinghouse Electric Corp., Pittsburgh, Pa.

[21] Appl. No.: 694,322

[22] Filed: May 1, 1991

[51] Int. Cl.$^5$ ............................................. H02K 5/12
[52] U.S. Cl. ................................... 384/306; 384/308; 440/6; 310/87
[58] Field of Search ................. 384/306, 307, 308; 440/6, 67; 310/87, 90

[56] References Cited

U.S. PATENT DOCUMENTS

| | | | |
|---|---|---|---|
| 1,996,195 | 4/1935 | Ferguson | 239/272 |
| 2,197,432 | 4/1940 | Kingsbury | 384/308 |
| 3,398,996 | 8/1968 | Wucherer | 384/308 |
| 3,708,251 | 1/1973 | Pierro | 417/356 |
| 4,360,751 | 11/1982 | Arnold, Jr. et al. | 310/63 |
| 4,459,087 | 1/1984 | Barge | 310/63 |
| 4,544,285 | 10/1985 | Shapiro et al. | 384/306 |
| 4,657,411 | 4/1987 | Bath | 384/308 |
| 4,831,297 | 5/1989 | Taylor et al. | 440/6 |
| 4,876,492 | 10/1989 | Lester et al. | 310/63 |

FOREIGN PATENT DOCUMENTS

| | | | |
|---|---|---|---|
| 643644 | 6/1962 | Canada | 384/306 |
| 235295 | 10/1986 | Japan | 440/67 |
| 1439806 | 6/1976 | United Kingdom | 310/87 |

OTHER PUBLICATIONS

Brochure of Jastram-Werke GmbH KG entitled "Jastram Forschung—From the Idea to the Marketable Product" dated Aug. 1988.

Waukesha Bearings Publication No. TPF-100, Tilting Pad Thrust Bearing Selection Guide, undated.

*Primary Examiner*—Michael J. Carone

[57] ABSTRACT

A pivoted pad bearing assembly of the Kingsbury type provides for leveling of bearing pads arranged in a circular array utilizing hydrostatic pressure rather than mechanical links. The leveling device is in the form of a hydraulic bearing support module having a variable volume hydraulic chamber. Pipe segments connect each hydraulic chamber to form a closed circuit and the circuit is completely filled with hydraulic fluid. Thereby, equal force will be exerted upon each pad at all times so that all pads will operate at an equal thrust load. The bearing assembly has particularly useful application in an integral motor submersible propulsor as a large diameter thrust bearing housed within an outer shroud of the propulsor at both upstream and downstream ends of a rotor mounted about the periphery of a propeller of the propulsor. By placing the thrust bearing within the shroud, greater thrust bearing surface areas can be obtained to handle larger thrust. By using hydrostatic leveling, the noise associated with mechanical linkages is avoided, and the size and weight of the bearing assembly can advantageously be reduced.

31 Claims, 5 Drawing Sheets

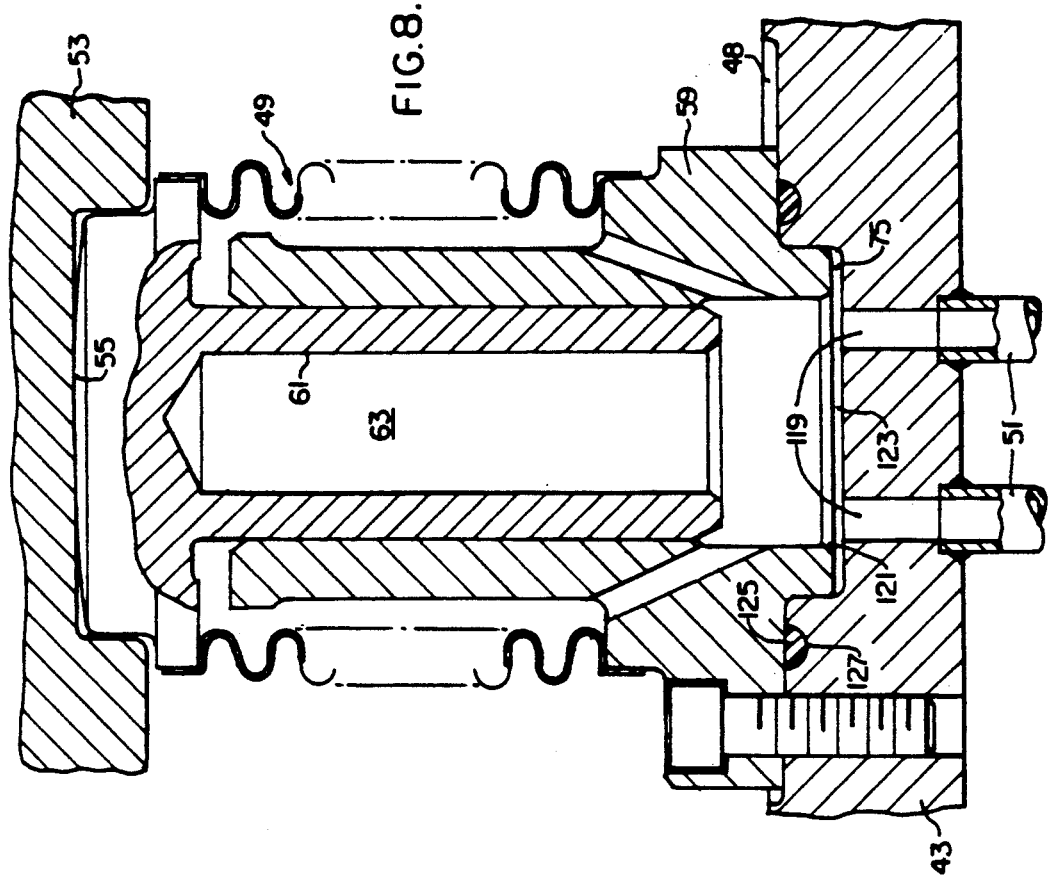
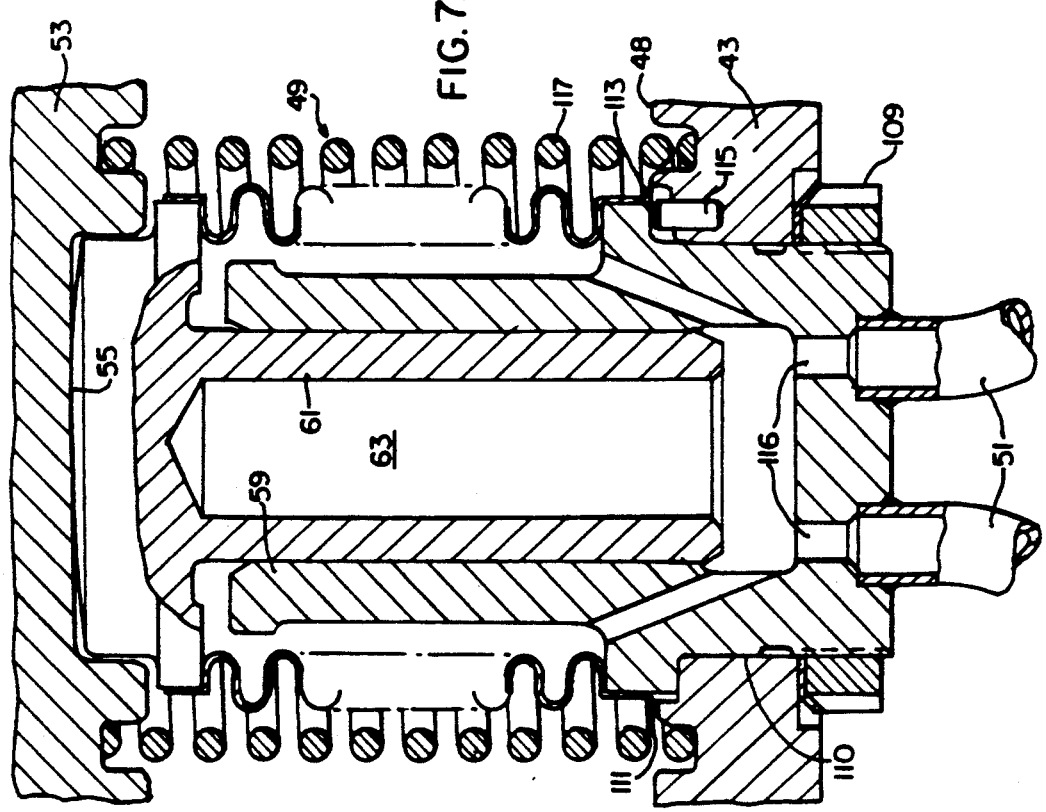

BEARING ASSEMBLY AND SUBMERSIBLE PROPULSOR UNIT INCORPORATING THE SAME

BACKGROUND OF THE INVENTION

This invention generally relates to bearing assemblies for interconnecting a rotating body to a stationary body, and to a submersible propulsor unit incorporating such a bearing assembly. More specifically, the invention relates to a pivoted pad bearing assembly for use as a thrust bearing in a submersible propulsor unit for powering a ship, submarine or other water vessel, and a submersible propulsor unit incorporating a large diameter thrust bearing in a shroud thereof.

Pivoted or tilting pad bearings of the Kingsbury type are well known. Such a bearing assembly is typically used to transmit thrust from a rotating member, e.g., a shaft, to a stationary member such as a housing. In such an arrangement, when the shaft is rotating, thrust forces are transferred from a thrust collar to the pivoted thrust pads through a film of oil that is self-generated between the collar and the pads. Typically, the thrust force then passes from the thrust pads through support disks, leveling links and a retainer to the bearing housing and finally to a foundation or support of the apparatus. A hydrodynamic film is created and maintained due to the viscosity of the fluid, relative motion between the shaft and pads and the converging geometry of the pads. It is important that the film fully separate the thrust collar and thrust pad at all times. Otherwise, excessive drag and wear of the bearing assembly will result. Where accurate alignment of the rotating shaft with the bearing pads cannot be assured throughout all operating conditions, it is known to employ leveling links to control pivoted pad height so that the load is shared equally by all pads. Such leveling links typically comprise multiple mechanical linking members provided between each pad. Such tilting pad thrust bearings are produced, e.g., by Waukesha Bearings and described in their undated publication No. TPF-100 entitled: TILTING PAD THRUST BEARING SELECTION GUIDE.

A characteristic of pivoted pad bearing assemblies of the above-mentioned type is that the leveling action of the leveling links tends to create mechanical noise. Also, mechanical leveling links tend to be heavy and bulky and thus increase substantially the size and weight of the resulting bearing assembly. Additionally, such leveling links do not consistently provide an equal distribution of the load among the pads under all operating conditions. While these characteristics do not necessarily create problems in all applications, they create significant problems in the context of electric motor type propulsor units, as will be described in greater detail hereinafter.

One of the most advanced electric motor type propulsor units for water vehicles is disclosed and claimed in U.S. Pat. No. 4,831,297 assigned to the Westinghouse Electric Corporation (the contents of which is hereby incorporated by reference to the extent necessary for a full understanding of the present invention). This particular propulsor unit resembles a jet engine in structure and generally comprises a cylindrical shroud having a water inlet and a water outlet, a propeller having a hub rotatably mounted within the shroud on a shaft that is concentrically mounted within the shroud by a plurality of support vanes, and an electric motor for driving the propeller that includes an annular rotor mounted around the periphery of the propeller blades, and a stator that is integrated within the shroud of the unit. The advanced design of this particular prior art propulsor unit substantially increases the thrust output for a propulsor for a given weight and size while at the same time reducing the amount of noise generated due to the largely unencumbered flow of water that the propeller of the device can force through the fluid-dynamically shaped shroud. The quietness of the unit is further improved due to the noise-blocking characteristics of the shroud.

Significant refinements of the above-mentioned submersible propulsor are disclosed and claimed in copending commonly assigned application Ser. No. 07/571,970, filed Aug. 23, 1990 (the contents of which is hereby incorporated by reference to the extent necessary for a full understanding of the present invention). In accordance with this propulsor, as well as the propulsor in accordance with U.S. Pat. No. 4,831,297, the bearing assembly comprises both radial bearing surfaces and thrust bearing surfaces provided between a hub of the propeller means and the concentrically located shaft upon which the propeller means is rotatably mounted. Such an arrangement is perfectly adequate for a number of propulsor applications. However, this arrangement is limited with respect to the amount of bearing surface area that can be provided for the thrust bearing. Namely, since the thrust bearing surfaces must extend perpendicularly to the fluid flow direction through the propulsor, as such surfaces are increased in size, the fluid passage defined by the shroud becomes restricted.

Integral motor submersible propulsors for a number of naval applications will require the adoption of large diameter water lubricated thrust bearings. Where an integral motor propulsor is used to power a large ship such as a frigate, very high thrust requirements of the propulsor will dictate that large thrust bearing surfaces be provided in order to reduce the force per unit area of the bearing surfaces to an acceptable level. Otherwise, a thrust bearing, e.g., of the pivoted pad type, will not function properly and components may eventually fail from fatigue under excessively concentrated loads. Accordingly, there is a need for a submersible propulsor with a thrust bearing assembly which can provide greater thrust bearing surface areas without restricting fluid flow through the propulsor.

Quiet operation is a critical requirement of a submersible integral motor propulsor to be used for navy applications. As described above, known Kingsbury pivoted pad type bearings require means for leveling the height of the pads with respect to the thrust runner in order to equalize the load among the pads and thereby compensate for dimensional variations in the bearing assembly including the pad supports and thrust runner. The noise created by mechanical leveling is thus particularly detrimental with respect to navy applications of a submersible integral motor propulsor. Therefore, there is clearly a need for a means for leveling the bearing surfaces of the bearing pads which avoids the noisiness of mechanical linkages.

It is also important to minimize the size and weight of an integral motor submersible propulsor. Thus, there is clearly a need for a pad leveling mechanism which is reduced in size and weight as compared to mechanical leveling links.

SUMMARY OF THE INVENTION

The several aspects of this invention seek to obviate or at least ameliorate the above-described shortcomings in (1) existing pivoted pad bearing assemblies generally, (2) thrust bearing assemblies of the pivoted pad type which are especially configured for use in an integral motor submersible propulsor, and (3) integral motor submersible propulsors themselves.

More specifically, it is an object of the present invention to provide a bearing assembly of the pivoted pad type which ameliorates the problems of prior art pivoted pad bearings provided with leveling links, i.e., noisy operation, incomplete leveling of the pads, and excessive size and weight.

It is another object of the invention to provide a thrust bearing configuration avoiding the problems of existing pivoted pad type thrust bearings having mechanical leveling links and being especially adapted for use in an integral motor submersible propulsor.

It is yet another object of the present invention to provide a submersible propulsor configuration having a thrust bearing assembly which allows greater thrust bearing surface areas and is thus able to handle larger thrust loads, without restricting the flow of water through the propulsor.

These and other objects are achieved by the present invention which, in a first primary aspect, provides a pivoted pad bearing assembly comprising an annular bearing housing, a circular array of bearing pads pivotally mounted in the bearing housing, each pad having a bearing surface for forming a thin film of fluid thereon, and load equalization means for leveling the bearing surfaces of the bearing pads with respect to each other by hydrostatic pressure and thereby equalizing the load applied thereto. The load equalization means includes pad support means for defining a variable volume hydraulic chamber between each pivoted pad and the bearing housing and thereby supporting each respective pad at a level corresponding to the volume of the chamber, conduit means for interconnecting each hydraulic chamber to form a closed circuit, and hydraulic fluid completely filling the conduit means.

In a second primary aspect, the present invention provides in a submersible propulsor unit having a shroud defining a water inlet and water outlet, a propeller means rotatably mounted within the shroud and an electric motor including a rotor mounted around the periphery of the propeller means and a stator mounted within the shroud spaced from but magnetically coupled to the rotor, a thrust bearing assembly comprising: an annular bearing housing fixedly secured within the shroud so as to be adjacent to and coextensive with a circumferential extent of the rotor; a circular array of bearing pads pivotally mounted in the bearing housing, each pad having a bearing surface; and an annular thrust runner attached to and coextensive with the circumferential extent of the rotor, opposite the bearing surfaces of the bearing pads, for transmitting thrust produced by the propeller means to the bearing pads through a thin film of fluid formed between the thrust runner and bearing surfaces.

In a third primary aspect, the present invention provides a submersible propulsor unit comprising: a shroud having a water inlet and a water outlet; a propeller means having a hub rotatably mounted within the shroud; an electric motor for driving the propeller means including a rotor mounted around the periphery of the propeller means and a stator mounted within the shroud and spaced away from but magnetically coupled to the rotor; a radial bearing assembly having bearing surfaces disposed between the hub of the propeller and the shaft; and a thrust bearing assembly having bearing surfaces disposed within the shroud between an end portion of the rotor and a shoulder portion of the shroud overlying the rotor in a radial direction of the propeller means.

These and other objects and features of the present invention will be apparent and fully understood from the following detailed description of the preferred embodiments, taken in connection with the accompanying drawings.

BRIEF DESCRIPTION OF THE DRAWINGS

FIGS. 7 and 8 are views similar to FIG. 6, showing alternative embodiments of the bearing assembly.

DETAILED DESCRIPTION OF THE PREFERRED EMBODIMENTS

Figure 1:
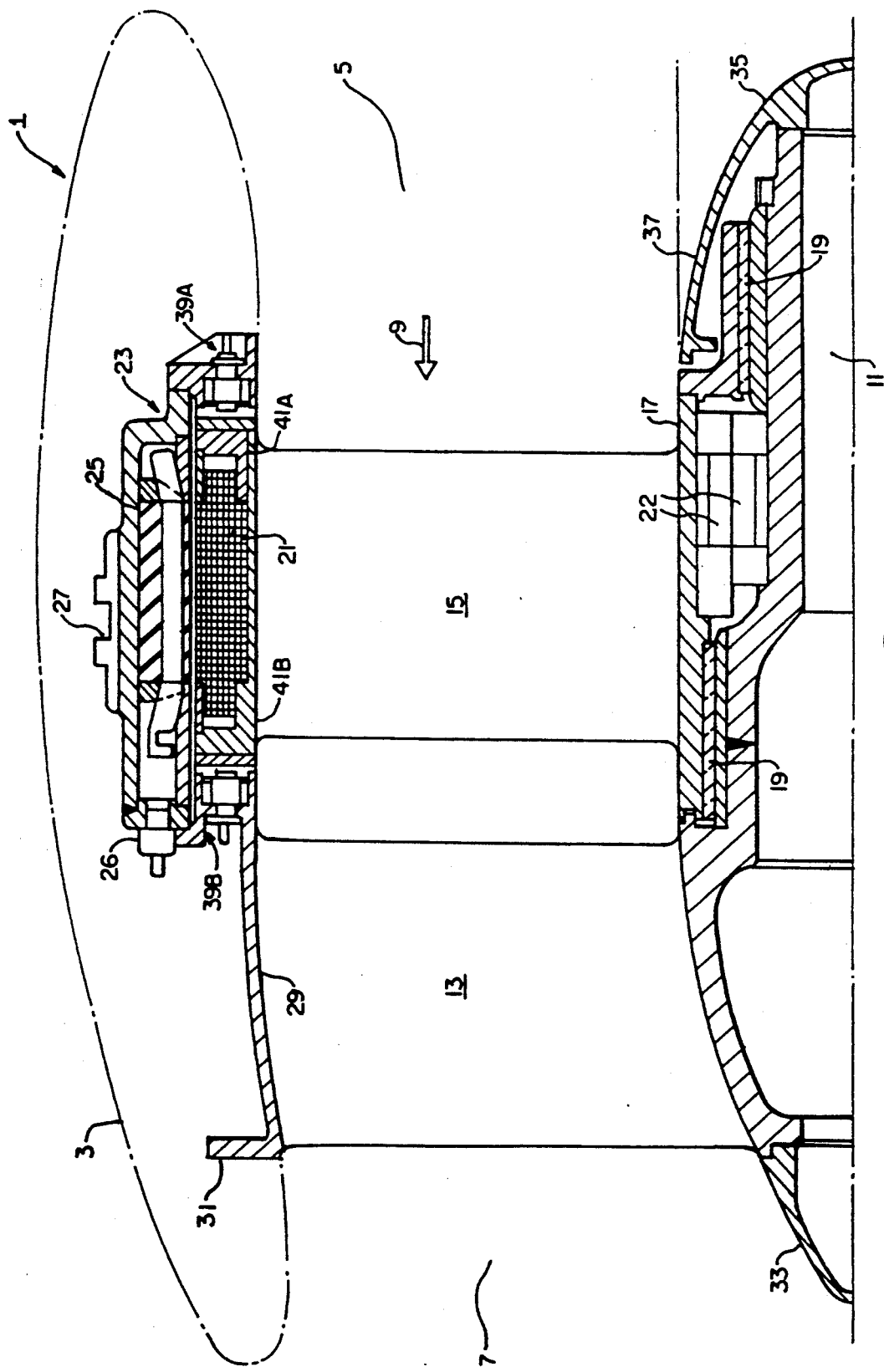
FIG. 1 is a cross-sectional view of an integral motor submersible propulsor unit incorporating a large diameter thrust bearing assembly in accordance with the present invention.

Referring to FIG. 1, shown is an integral motor submersible propulsor unit 1 comprising generally a shroud assembly 3 defining a water inlet 5 and water outlet 7, the direction of flow through propulsor 1 being designated by arrow 9. A stationary shaft 11 is concentrically mounted within shroud 3 by a plurality of vane members 13. Shroud 3 is hydrodynamically shaped, e.g., as a Kort nozzle. In this particular embodiment, shroud 3 is shown in phantom lines since it is actually part of a gondola assembly of the water vessel into which a subassembly of the remaining components of the propulsor is secured. Protrusions 27 depict schematically a keyway or other connection means for securing the preassembled motor and propeller sub-assembly into shroud 3. This sub-assembly is provided with an interior surface 29 which will lay flush with shroud 3 to form a smooth uninterrupted fluid passage. The sub-assembly may further be secured within shroud 3 via bolts or other known connecting means extending into end flange 31 of the sub-assembly.

A propeller 15 is disposed within the interior of shroud assembly 3 and includes a hub assembly 17 at its center which is rotatably mounted on stationary shaft 11 by means of two spaced radial bearing surface pairs 19. Each of mating radial bearing surfaces 19 are made of a suitable wear resistant material such as K-Monel or suitable ceramics. The propeller 15 includes a plurality of canted blades whose inner ends are equidistantly mounted around hub 17, and whose outer ends are connected to a rotor 21 forming part of an electric motor assembly 23 located within a central portion of shroud 3. Electric motor 23 further includes a stator 25 disposed around the rotor 23 within shroud 3 in a closely spaced relationship. The stator 25 is connected to a power source (not shown) which may be a variable frequency cyclo-converter or the like. The power supply is connected to stator 25 through a hermetically sealed electrical connector 26. This particular embodiment utilizes an synchronous-type A.C. motor, wherein rotor 21 is magnetized via a known type of brushless exciter 22. Alternatively, motor 23 may be of a permanent-magnet type as described in co-pending related application Ser. No. 07/571,970.

Stationary shaft 11 is provided with hydrodynamically shaped end caps 33 and 35. Cap 33 is mounted to a portion of the stationary shaft serving as a hub for vane members 13. This embodiment of the invention has a cantilever support structure, i.e., a single set of vanes 13 is provided downstream of propeller 15. By avoiding a plurality of vanes in front of propeller 15, the amount of noise generated by the stream of water flowing through the shroud is reduced. Cap 35 forms a protective structure 37 for the forward one of the two radial bearings 19. While not specifically shown, suitable passages are provided in order to lubricate each of mating radial bearing surfaces 19.

Unlike previous designs, there are no thrust bearing surfaces provided between propeller hub 17 and stationary shaft 11. Rather, in the present invention, large diameter primary and secondary thrust bearing assemblies 39A and 39B are housed within shroud 3, as is discussed in detail below.

Primary and secondary thrust bearing assemblies 39A, 39B are each annular in shape and are provided adjacent to and co-extensive with upstream and downstream edge portions 41A,41B of rotor 21, respectively. Each of annular edge portions 41A,41B is provided with a suitable bearing surface such as K-Monel or ceramics and thus rotor 21 doubles as a two-sided thrust runner. Bearing assemblies 39A, 39B form inner shoulder portions overlying end portions 41A,41B of rotor 21 such that forward thrust of propeller 15 is transmitted to shroud 3 and thereby to the water vessel via primary bearing assembly 39A, whereas reverse thrust is transmitted in the same fashion via secondary bearing assembly 39B. By locating the thrust bearings between shroud 3 and rotor 21, a much larger total thrust bearing surface area can be obtained as compared with previous designs wherein the thrust bearing surfaces are located between the propeller hub and concentrically mounted stationary shaft. Furthermore, the housing surrounding the stationary shaft 11 can be shaped so as to optimize hydrodynamic flow without limiting the surface areas of the thrust bearing surfaces. Since bearing assemblies 39A and 39B are, except for their opposed orientation, essentially identical, bearing assembly 39A will be described in detail as being representative of each bearing assembly.

Figure 3:
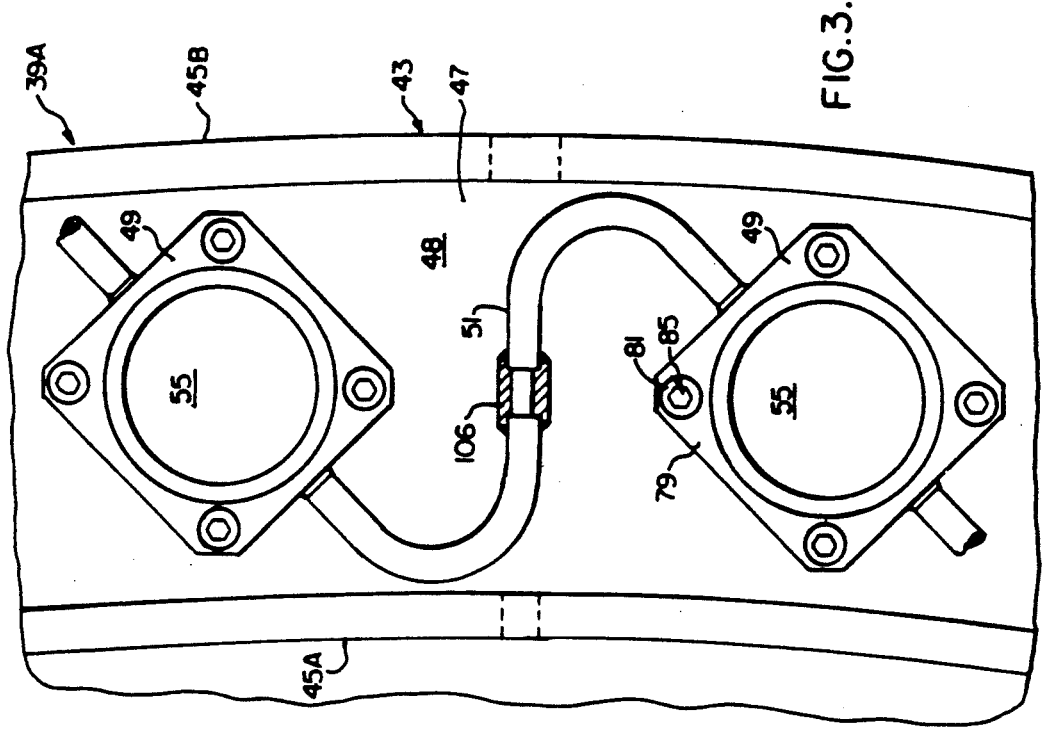
FIG. 3 is a view similar to FIG. 2 but showing a modification wherein the pipe segments interconnecting the support modules comprise an intermediately located welded joint.
Figure 2:
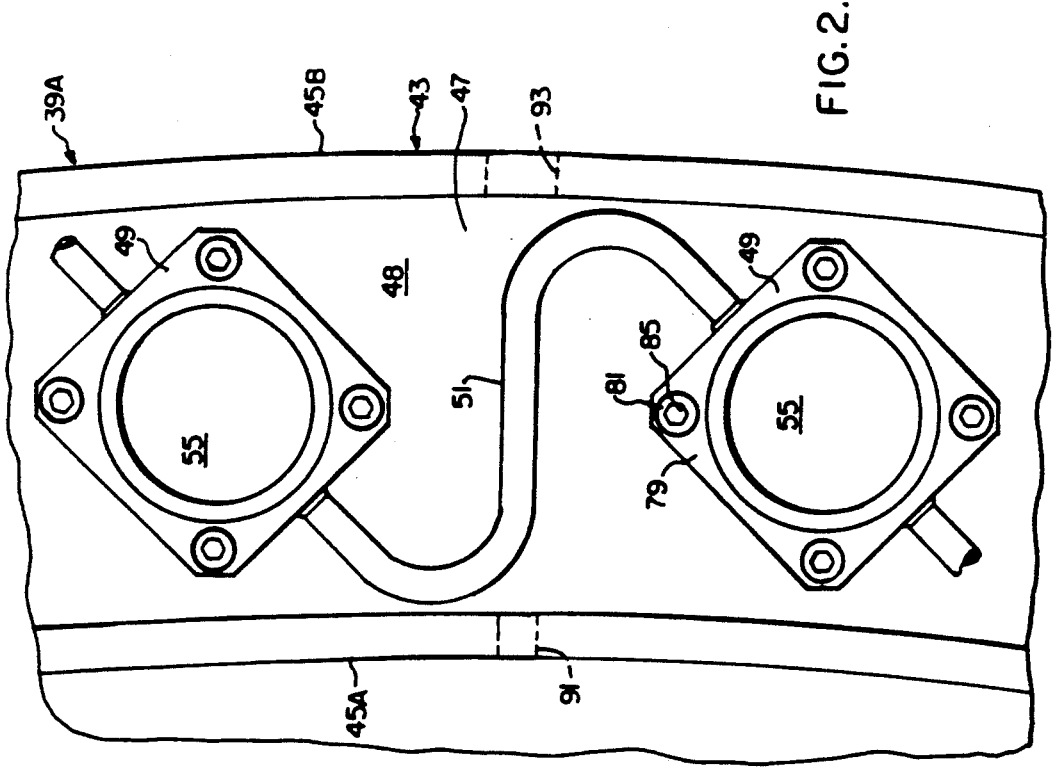
FIG. 2 is a partial frontal view of the annular bearing housing showing pivoted pad support modules (with the pivoted pads removed) mounted and interconnected therein.
Figure 4:
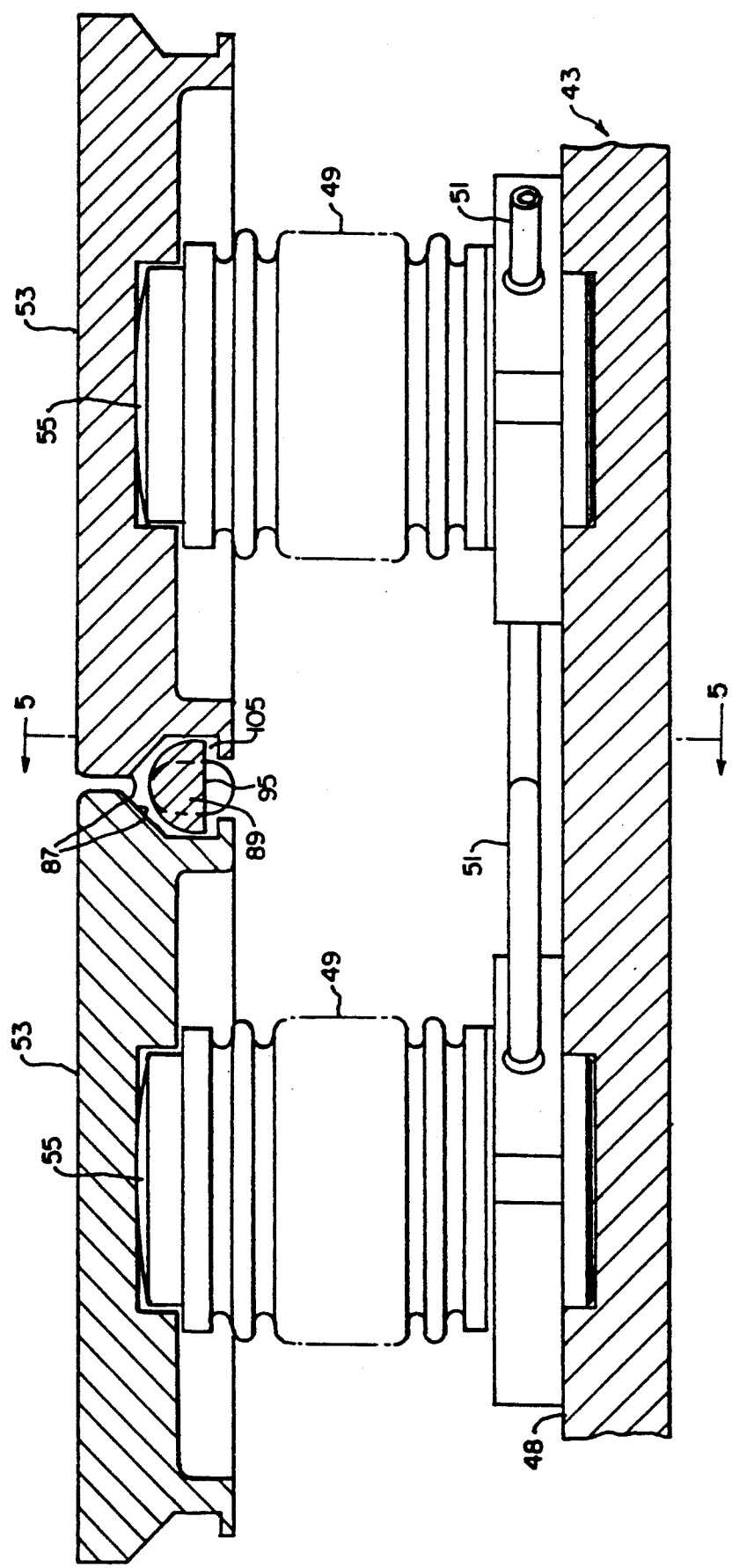
FIG. 4 is a partial cross-sectional view of two adjacent pivoted pads and supporting modules attached in the annular bearing housing.
Figure 5:
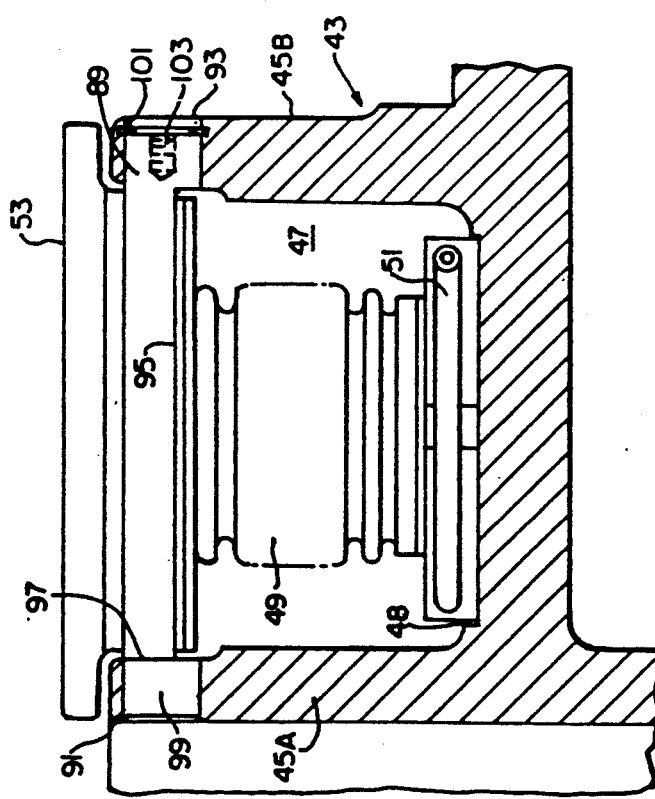
FIG. 5 is a partial cross-sectional view of the bearing assembly taken along section line A—A in FIG. 4.

With reference to FIGS. 2, 3 and 5 it can be seen that thrust bearing assembly 39A comprises an annular bearing housing 43 provided with upstanding inner and outer flanges 45A, 45B and defining therebetween an annular channel 47 and support surface 48. Within channel 47 on support surface 48 is mounted a circular array of hydraulic support modules 49 fluidically interconnected by S-shaped pipe segments 51. The S-shape of pipe segments 51 advantageously provides pipe flexibility so that the segments 51 can be fitted between modules 49 without precise tolerancing of the pipe segment lengths. As seen in FIG. 4, pivoted bearing pads 53 are loosely mounted over spherical surfaces 55 of hydraulic support modules 49. Bearing pads 53 are provided with surfaces of hardened material (e.g., K-Monel or suitable ceramics) and configured with a slight taper so as to form thereon a thin fluid film in operation, as is known in the art.

With specific reference to FIG. 6, details of the support modules 49 in accordance with a first embodiment of the present invention will now be described. Spherical surface 55 upon which pivoted pad 53 is mounted is provided on an upper enlarged portion of a piston 57 slidably mounted in a hollow cylindrical body 59. An elongated hollowed out portion 61 of piston 57 slides within cylindrical body 59 to thereby form a variable volume hydraulic chamber 63 between pivoted pad 53 and support surface 48 of annular bearing housing 43.

As already mentioned, conduit means such as pipe segments 51 interconnect each support module 49. More specifically, pipe segments 51 interconnect variable volume chambers 63 of respective support modules 49. In the first embodiment of the invention shown in FIG. 6, pipe segment 51 is connected by welding to passage 67 leading to chamber 63. Chamber 63 is further provided in fluid communication via passage 69 with a secondary chamber 71 formed between cylindrical body 59 and a metallic bellows 73 acting to hermetically seal piston 57 and cylindrical body 59. Piston 57 and cylindrical body 59 could be sealed by piston rings mounted on piston 57. However, the illustrated metallic bellows arrangement is more effective in preventing leakage of fluid from hydraulic chamber 63.

Once assembly of the component pieces of the bearing assembly is completed, the circuit defined by the interconnected support modules 49 is first evacuated and then filled with hydraulic fluid. This is preferably achieved by providing two special couplings (not shown), one to be connected to a vacuum pump and the other to a container of hydraulic fluid. The special couplings may taken the form of two pipes connected at separate locations to one of the pipe segments 51 and/or support modules 49. A vacuum is created in the circuit by the vacuum pump attached to one coupling (pipe). Then, that coupling is sealed, e.g., by crimping the pipe. Next, the other coupling communicating with the container of hydraulic fluid is opened so that the hydraulic fluid is drawn in by the vacuum to completely fill the circuit without any air bubbles. After the circuit is properly filled with hydraulic fluid, the second coupling is sealed, e.g., by crimping the pipe. So configured, the annular array of interconnected support modules 49 constitute load equalization means for leveling the bearing surfaces of the bearing pads 53 with respect to each other by hydrostatic pressure. More specifically, because each piston 57 has an equal area exposed to the hydraulic fluid, equal support force will be exerted at each module, so that all pads 53 will operate at an equal thrust load. Thrust equalization will be accurately maintained regardless of variations in the axial location of support modules 49 or axial runout of the thrust runner (constituted by end portion 41A of rotor 21) within the limit of the piston travel. Furthermore, load equalization is achieved without the noise generated by mechanical linkage means and economies of size and weight can be realized.

Figure 6:
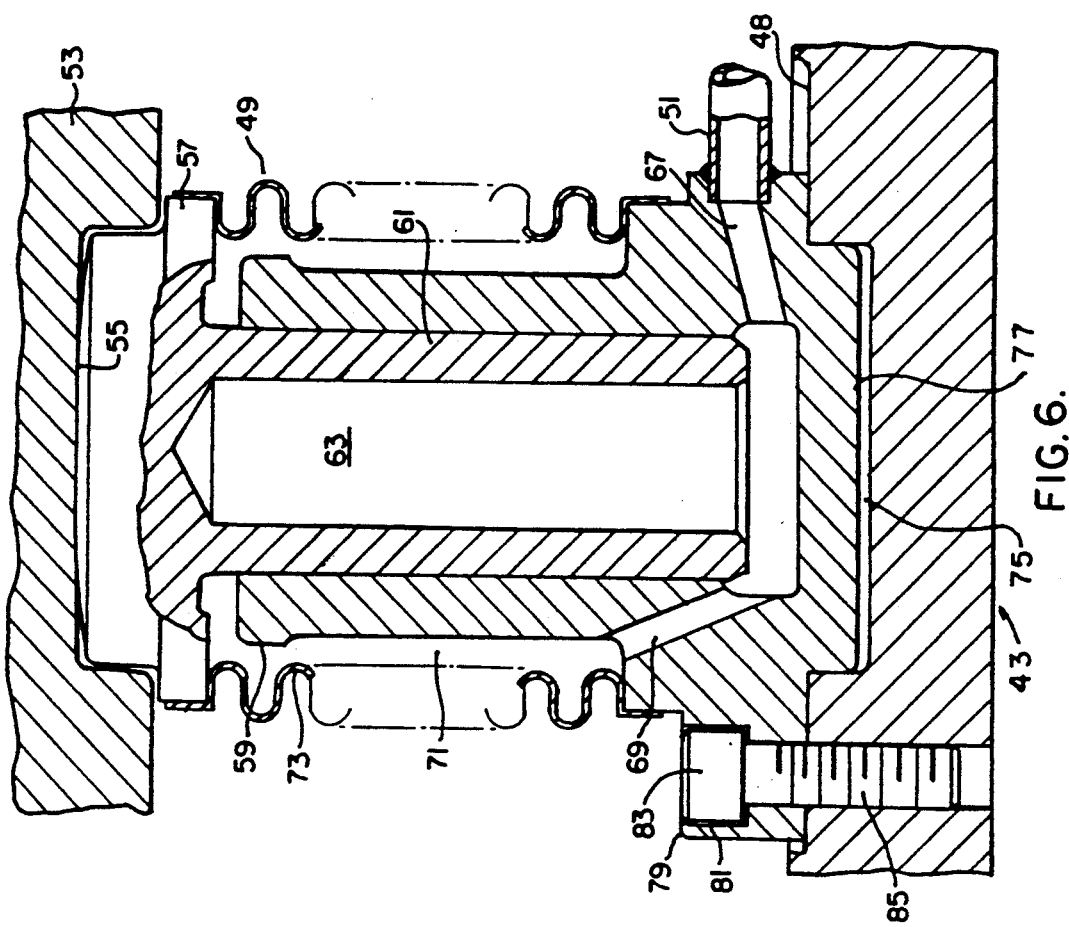
FIG. 6 is a partial cross-sectional view of the bearing assembly showing details of the plurality of pivoted pad support modules making up the bearing assembly.

In the first embodiment of the support module as shown in FIG. 6, support module 49 is secured to bearing housing 43 by means of a recess 75 provided in support surface 48 and a complimentarily shaped protruding portion 77 provided at the bottom of module 49. Furthermore, an integral part of cylindrical body 59 is a flange 79 having holes 81 with bolts 83 extending therethrough into tapped holes 85 provided in support surface 48 of bearing housing 43. As seen in FIGS. 2 and 3, flange 79 has a generally square shape with a hole 81 (only one labeled) provided at each corner.

Bearing assembly 39A is made up by as many modules 49 as the number of pads required to form a complete thrust bearing. The number of pads for a particular diameter thrust bearing will be determined, in accordance with well known principles pertaining to pivoted pad bearings, to insure that an adequate pressure wedge is formed by the fluid (in this case ambient water) between the thrust runner (rotor end portion 41A) and each bearing pad 49 so as to maintain a thin film therebetween. For example, the circumferential length of each pad generally should not exceed twice the radial width of each pad. Preferably, the circumferential length of each pad is approximately equal to the radial width.

A structure is now described for retaining pivoted pads 53 on spherical surfaces 55 during assembly, and during operation when the bearing is unloaded. Referring to FIG. 4, each pad 53 is provided with a groove 87, formed by known means such as machining or casting, at each circumferential end portion thereof. Grooves 87 of adjacent pads 53 come together to form a channel through which extends a pin 89. (See also FIG. 5.) Pin 89 also extends into holes 91 and 93 provided in radially inner flange 45A and radially outer flange 45B. Pin 89 is basically cylindrically shaped but has a central portion wherein a part of the cylinder is removed to provide a flat surface 95 for mating with respective surfaces provided in the channel forming grooves 87 of adjacent pads 53. To insure that the pin is properly oriented upon insertion, hole 91 in radially inner flange 45A is provided with an oval shape and the corresponding end portion 99 of pin 89 is machined to an oval shape so as to fit therein. Pin 89 is retained against axial movement in the radially inwardly direction by a shoulder 97 formed adjacent oval end portion 99. Axial movement in the radially outward direction is restrained by an elastic ring 101 provided in a groove machined into hole 93 provided in radially outer flange 45B. To allow removal of pin 89, e.g., for maintenance operations, the end of pin 89 extending into hole 93 is provided with a tapped hole 103 into which a pulling tool can be threadably secured. While pins 89 are effective to retain pads 53, they do not interfere with proper pivoting on the pads on spherical surfaces 55 in operation. Namely, during operation, a gap 105 as seen in FIG. 4 is maintained between the flat surface 95 and the corresponding flat surfaces of adjacent grooves 87.

The support modules 49 and pipe segments 51 may be manufactured, assembled and hydrotested in a different location from the assembly of the circular array of modules 49 to annular thrust bearing housing 43. In this case, it may be more convenient for shipment to assemble sub-parts of the circular array of support modules 49, especially in the case of a very large diameter thrust bearing as would be used for certain navy applications. Then, the sub-parts of the circular array would be connected at the time of assembly to thrust bearing housing 43. FIG. 3 shows a modification of the arrangement shown in FIG. 2, wherein an optional weld joint 106 is provided on pipe segment 51 to be performed at the time of assembly of the support modules 49 to the annular bearing housing 43. This facilitates welding since once the modules are placed within channel 47 of housing 43 it becomes difficult to weld the pipe segments directly onto the modules 49.

FIGS. 7 and 8 show alternative designs for support modules 49. Therein, like reference numerals are used to designate like elements. Referring to the embodiment of FIG. 7, bolting flange 79 in the embodiment of FIG. 6 has been eliminated and replaced with a lock nut arrangement 109. In this embodiment, the lower end of support module 49 extends into a complimentarily sized through bore 110 provided in support surface 48. Shoulders 111 and 113 are provided integral with cylindrical body 59 to rest on surface 48. One or more pins 115 are provided in support surface 48 as a means for properly positioning and orienting each support module 49. In this embodiment, the connecting pipes 51 must be welded to support modules 49 after assembly of the modules onto thrust bearing housing 43. As shown, in this embodiment the passages 116 leading to variable volume hydraulic chamber 63 extend along the direction of movement of piston 61, through a lower portion of cylindrical body 59.

An additional feature of the embodiment shown in FIG. 7 is a coil spring 117 inserted between pivoted pad 53 and support surface 48. Such a spring advantageously prevents rattling of the pivoted pads 53 when the thrust bearing is unloaded. It will be appreciated that such a spring can be incorporated into each of the support module embodiments described herein. With reference to FIG. 4, it can be seen that by biasing pad 53 in an outward direction, the flat surface of groove 87 will come into resting contact with the flat surface provided on pin 95. The stiffness of the spring is chosen so as not to interfere with proper functioning of the pivoted bearing pad 53 during operation.

Referring now to FIG. 8, a third support module embodiment is shown wherein module 49 is bolted to surface 48 and sits in a recess 75, similar to the embodiment of FIG. 6. In this case, however, pipe segments 51 are welded to annular thrust bearing housing 43 in communication with passages 119 extending therethrough. Opposite ends of passages 119 are provided in recess 75. Cylindrical body 59 comprises and open end 121 such that an end portion of chamber 63 is formed by bottom surface 123 of recess 75. In this embodiment, it is essential that a hermetic seal be maintained between housing 43 and module 49. Such a hermetic seal can be insured by an O-ring 125 provided in a special groove 127 conforming closely in shape and size to the O-ring. Such a groove will not trap air during the vacuum operation that could be released into the hydraulic fluid at a later time.

As seen in FIGS. 2 and 3, in the first embodiment of modules 49, pipe segments 51 extend along support surface 48 in channel 47 of annular bearing housing 43. In contrast, in the alternative embodiments illustrated in FIGS. 7 and 8, the pipe segments extend along a side of housing 43 opposite channel 43.

The structural components of the propulsor and bearing assembly of the present invention may be comprised of various suitable materials as are known in the art.

Those structural components which will be in contact with sea water must be composed of materials which exhibit sufficient structural strength yet are highly resistant to corrosion. One suitable material for such structural components is nickel aluminum bronze alloy.

The invention has been described in terms of exemplary embodiments thereof. Other embodiments and modifications within the scope and spirit of the invention will occur to those skilled in the art.

We claim:

1. In a submersible propulsor unit having a shroud defining a water inlet and water outlet, a propeller means having a hub rotatably mounted on a shaft and a circumferential extent rotatably mounted within the shroud, and an electric motor including a rotor mounted around the periphery of the propeller means and a stator mounted within said shroud spaced from but magnetically coupled to said rotor; a bearing arrangement comprising:

a thrust bearing assembly including
1) an annular bearing housing fixedly secured within said shroud so as to be adjacent to and coextensive with said circumferential extent of said rotor;
2) a circular array of bearing pads pivotally mounted in said bearing housing, each pad having a bearing surface; and
3) an annular thrust runner attached to and coextensive with the circumferential extent of said rotor, opposite the bearing surfaces of said bearing pads, for transmitting thrust produced by the propeller means to said bearing pads, for transmitting thrust produced by the propeller means to said bearing pads through a thin film of fluid formed between said thrust runner and said bearing surface, and a radial bearing assembly having bearing surfaces disposed between the hub of said propeller means and said shaft.

2. A thrust bearing assembly according to claim 1, further comprising load equalization means for leveling the bearing surfaces of the bearing pads with respect to one another by hydraulic pressure and thereby equalizing the load applied thereto.

3. A thrust bearing assembly according to claim 2, wherein said load equalization means includes:
1) pad support means for defining a variable volume hydraulic chamber between each pivoted pad and the bearing housing and thereby supporting each respective pad at a level corresponding to the volume of said chamber;
2) conduit means for interconnecting each hydraulic chamber to form a closed circuit; and
3) hydraulic fluid completely filling the conduit means.

4. A thrust bearing assembly according to claim 3, wherein said pad support means comprises a piston movable in a cylinder for defining each variable volume hydraulic chamber.

5. A thrust bearing assembly according to claim 4, wherein each bearing pad is pivotally mounted over a spherical surface provided at an end portion of a respective one of said pad support means.

6. A thrust bearing assembly according to claim 4, wherein each of said bearing pads is pivotally retained on an end portion of said pad support means by at least one pin secured to said annular bearing housing and extending through said bearing pad.

7. A thrust bearing assembly according to claim 6, wherein each of said bearing pads has a groove provided at each of circumferential end portions thereof, the grooves of adjacent bearing pad end portions cooperating to form a channel through which one of said pins extends to secure each bearing pad on a respective pad support means when the bearing assembly is unloaded.

8. A thrust bearing assembly according to claim 6, wherein said annular bearing housing comprises inner and outer circumferentially extending flanges defining a circumferentially extending channel, each of said pad support means being fixed within said channel and each of said pins extending into holes provided in the two flanges in registry with respective pairs of bearing pads.

9. A thrust bearing assembly according to claim 3, wherein said pad support means are secured around a peripheral surface of the annular bearing housing in an equally spaced manner.

10. A thrust bearing assembly according to claim 9, wherein said conduit means comprises pipe segments which extend between said hydraulic chambers along said peripheral surface of the annular bearing housing.

11. A thrust bearing assembly according to claim 10, wherein said pipe segments include at least two pipe segments extending respectively from each of adjacent hydraulic chambers and being sealably connected to each other by a welded joint intermediate each pair of adjacent chambers.

12. A submersible propulsor unit, comprising:
1) a shroud having a water inlet and a water outlet;
2) a propeller means having a hub rotatably mounted within said shroud on a shaft;
3) an electric motor for driving said propeller means including a rotor mounted around the periphery of said propeller means, and a stator mounted within said shroud and spaced away from but magnetically coupled to said rotor;
4) a radial bearing assembly having bearing surfaces disposed between the hub of said propeller means and said shaft; and
5) a thrust bearing assembly having bearing surfaces disposed within said shroud between an end portion of said rotor and a shoulder portion of said shroud overlying the rotor in a radial direction of the propeller means.

13. A submersible propulsor unit according to claim 12, wherein said thrust bearing assembly includes a pair of opposed bearing surfaces adjacent each of opposite end portions of the rotor for transmitting to the shroud both forward and reverse produced by the propeller means.

14. A submersible propulsor unit according to claim 11, wherein said thrust bearing assembly comprises:
1) an annular bearing housing fixedly secured within said shroud so as to be adjacent to and coextensive with a circumferential extent of said rotor;
2) a circular array of bearing pads pivotally mounted in said bearing housing, each pad having a bearing surface; and
3) an annular thrust runner attached to and coextensive with the circumferential extent of said rotor, opposite the bearing surfaces of said bearing pads, for transmitting thrust produced by the propeller means to said bearing pads through a thin film of fluid formed between said thrust runner and said bearing surfaces.

15. A submersible propulsor unit according to claim 14, further comprising load equalization means for leveling the bearing surfaces of the bearing pads with respect to one another by hydrostatic pressure and thereby equalizing the load applied thereto.

16. A submersible propulsor unit according to claim 15, wherein said load equalization means includes:
1) pad support means for defining a variable volume hydraulic chamber between each pivoted pad and the bearing housing and thereby supporting each respective pad at a level corresponding to the volume of said chamber;
2) conduit means for interconnecting each hydraulic chamber to form a closed circuit; and
3) hydraulic fluid completely filling the conduit means.

17. A submersible propulsor unit according to claim 16, wherein said pad support means comprises a piston movable in a cylinder for defining each variable volume hydraulic chamber.

18. A submersible propulsor unit according to claim 17, wherein each bearing pad is pivotally mounted over a spherical surface provided at an end portion of a respective one of said pad support means.

19. A submersible propulsor unit according to claim 17, wherein each of said bearing pads is pivotally retained on an end portion of said pad support means by at least one pin secured to said annular bearing housing and extending through said bearing pad.

20. A submersible propulsor unit according to claim 19, wherein each of said bearing pads has a groove provided at each of circumferential end portions thereof, the grooves of adjacent bearing pad end portions cooperating to form a channel through which one of said pins extends to secure each bearing pad on a respective pad support means when the bearing assembly is unloaded.

21. A submersible propulsor unit according to claim 19, wherein said annular bearing housing comprises inner and outer circumferentially extending flanges defining a circumferentially extending channel, each of said pad support means being fixed within said channel and each of said pins extending into holes provided in the two flanges in registry with respective bearing pads.

22. A submersible propulsor unit according to claim 16, wherein said pad support means are secured around a peripheral surface of the annular bearing housing in an equally spaced manner.

23. A submersible propulsor unit according to claim 22, wherein said conduit means comprises pipe segments which extend between said hydraulic chambers along said peripheral surface of the annular bearing housing.

24. A submersible propulsor unit according to claim 22, wherein said pipe segments include at least two pipe segments extending respectively from each of adjacent hydraulic chambers and being sealably connected to each other by a welded joint intermediate each pair of adjacent chambers.

25. A submersible propulsor unit, comprising:
1) a shroud having a water inlet and a water outlet;
2) a propeller means having a hub rotatably mounted on a shaft, and a peripheral portion rotatably mounted within said shroud;
3) a radial bearing assembly having bearing surfaces disposed between the hub of said propeller means and said shaft; and
4) a thrust bearing assembly having bearing surfaces disposed within said shroud and the peripheral portion of said propeller means.

26. A submersible propulsor unit according to claim 25, further comprising an electric motor for driving said propeller means including a rotor that forms said peripheral portion of said propeller means, and a stator mounted within said shroud and spaced away from but magnetically coupled to said rotor, wherein the bearing surfaces of said thrust bearing assembly are disposed between said rotor and stator.

27. A submersible propulsor unit according to claim 26, wherein said bearing surfaces of said thrust bearing assembly are disposed between an end portion of said rotor and a shoulder portion of said shroud overlying the rotor in a radial direction of the propeller means.

28. A submersible propulsor unit, comprising:
1) a shroud having a water inlet and a water outlet and being circumscribed by an annular recess on its inner diameter;
2) a propeller means having a peripheral portion rotatably mounted in said annular recess in said shroud, and
3) a thrust bearing assembly having bearing surfaces disposed between the recess in said shroud and the peripheral portion of said propeller means for receiving the thrust force generated by the propeller means against said shroud, wherein said bearing surfaces communicate with ambient water in order to lubricate said surfaces.

29. A submersible propulsor unit according to claim 28, wherein said propeller means includes a hub rotatably mounted on a centrally disposed shaft in the interior of said shroud, and further comprising a radial bearing assembly having bearing surfaces between said shaft and said hub.

30. A submersible propulsor unit according to claim 28, wherein said thrust bearing assembly includes an annular bearing housing fixedly secured around the recess in said shroud, a circular array of bearing pads mounted in said housing, each of which includes a bearing surface, and load equalization means for leveling the bearing surfaces with respect to one another in response to a thrust load.

31. A submersible propulsor unit according to claim 28, wherein said hydraulic load equalization means includes a pad support means for each of said bearing pads, wherein each pad support means includes a piston movable in a hydraulic cylinder filled with a hydraulic fluid, and the hydraulic fluid of each cylinder of each pad support means intercommunicates such that the hydraulic pressure applied to each pad support means is equal.

* * * * *